United States Patent
Mergen

(10) Patent No.: US 7,548,198 B2
(45) Date of Patent: Jun. 16, 2009

(54) METHOD AND SYSTEM FOR PROVIDING PREFERENCE BASED LOCATION AWARE CONTENT

(75) Inventor: John-Francis Mergen, Baltimore, MD (US)

(73) Assignee: Federal Network Systems LLC, Arlington, VA (US)

(*) Notice: Subject to any disclaimer, the term of this patent is extended or adjusted under 35 U.S.C. 154(b) by 0 days.

(21) Appl. No.: 11/864,556

(22) Filed: Sep. 28, 2007

(65) Prior Publication Data
US 2009/0085803 A1    Apr. 2, 2009

(51) Int. Cl.
*G01S 5/14* (2006.01)
(52) U.S. Cl. .................... 342/357.09; 342/357.07; 342/357.1; 342/357.13; 701/209; 701/210
(58) Field of Classification Search ............ 342/357.07, 342/357.09, 357.1, 357.13; 701/209, 210
See application file for complete search history.

(56) References Cited

U.S. PATENT DOCUMENTS

| | | | | | |
|---|---|---|---|---|---|
| 5,938,721 | A | * | 8/1999 | Dussell et al. | 701/211 |
| 6,320,534 | B1 | * | 11/2001 | Goss | 342/357.1 |
| 6,324,471 | B1 | * | 11/2001 | Katayama et al. | 342/357.13 |
| 2002/0062360 | A1 | * | 5/2002 | Ishiguro | 342/357.09 |
| 2002/0199018 | A1 | * | 12/2002 | Diedrich et al. | 709/245 |
| 2005/0128102 | A1 | | 6/2005 | Obradovich | |
| 2007/0208749 | A1 | | 9/2007 | Price | |
| 2008/0007399 | A1 | | 1/2008 | Hart | |

FOREIGN PATENT DOCUMENTS

| | | |
|---|---|---|
| CA | 22922252 | 4/2001 |
| CA | 2349906 | 12/2001 |
| GB | 2278196 | 11/1994 |
| GB | 2382505 | 5/2003 |
| GB | 2416870 | 2/2006 |
| WO | WO 98/20631 | 5/1998 |
| WO | WO 01/61671 | 2/2001 |
| WO | WO 04/055542 | 7/2004 |

* cited by examiner

*Primary Examiner*—Thomas H Tarcza
*Assistant Examiner*—Fred H Mull

(57) ABSTRACT

A system and method in accordance with exemplary embodiments may include receiving data associated with retrieving location specific downloadable content for a Global Positioning System (GPS) enabled device via a network, retrieving location specific downloadable content at least based on an approximate location of the Global Positioning System (GPS) enabled device, and sending location specific downloadable content to the Global Positioning System (GPS) enabled device via the network.

18 Claims, 5 Drawing Sheets

US 7,548,198 B2

METHOD AND SYSTEM FOR PROVIDING PREFERENCE BASED LOCATION AWARE CONTENT

BACKGROUND INFORMATION

People may frequently travel from location to location because of career responsibilities and/or personal travel time. During their travels, many people may pass by historic landmarks, monuments, memorials, and/or other places of interest. These places of interest may go unnoticed due to a lack of awareness of their existence. The advent of the Internet has provided people with access to a plethora of documents associated with various topics. In some instances, people may look up and research different topics associated with their travel plans, but filtering through the offerings based on specific preferences and topic criteria often results in them settling for a less desired option due to their lack of awareness of a superior choice.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

A system and method in accordance with exemplary embodiments may include receiving data associated with retrieving location specific downloadable content for a Global Positioning System (GPS) enabled device via a network, retrieving location specific downloadable content at least based on an approximate location of the Global Positioning System (GPS) enabled device, and sending location specific downloadable content to the Global Positioning System (GPS) enabled device via the network.

The description below describes servers, mobile devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, mobile devices, and network elements, etc.) separately. The functions described as being performed at various components may be performed at other components, and the various components may be combined and/or separated. Other modifications also may be made.

Figure 1:
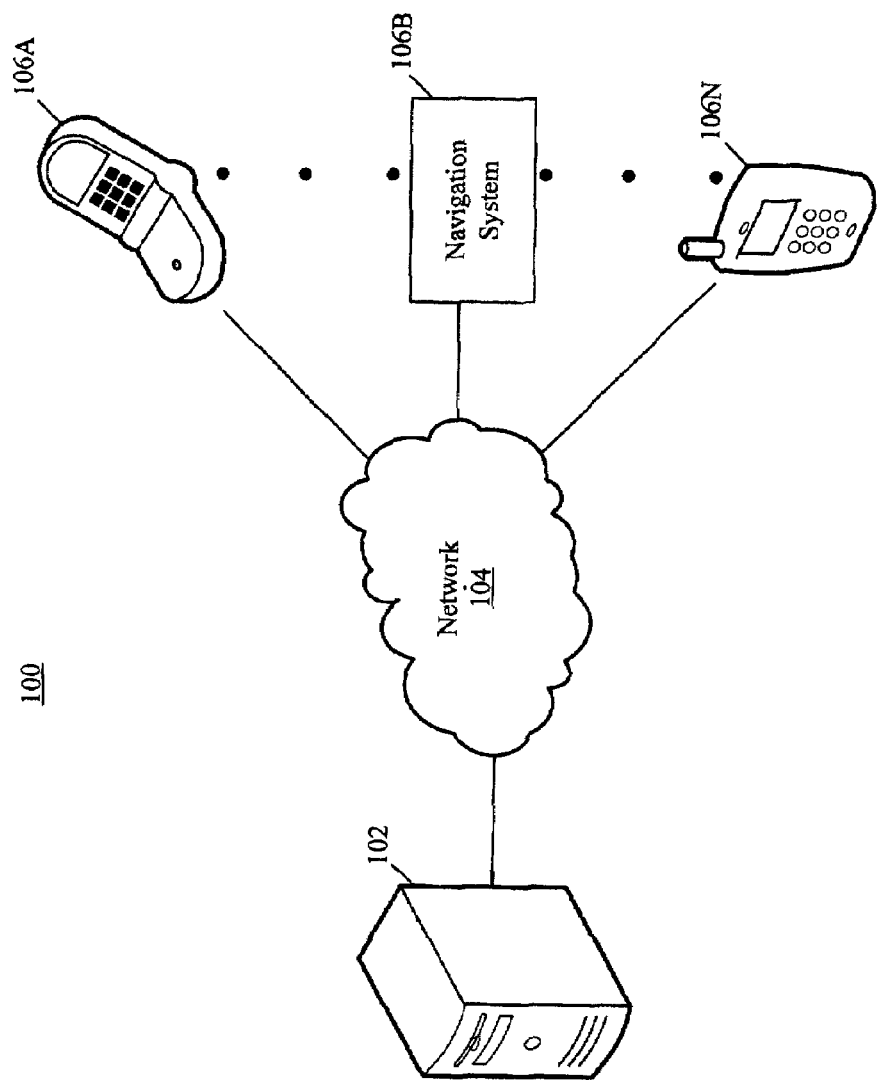
FIG. 1 illustrates a system in accordance with exemplary embodiments.

FIG. 1 illustrates a system 100 in accordance with exemplary embodiments. The server 102 may receive periodic location signals from a Global Positioning System (GPS) enabled device 106. It should be noted that the term "approximate location" may be used herein due to the built-in inaccuracies of Global Positioning System (GPS) technology. The location signals can include a geotag that references the location (e.g., latitude coordinates and longitude coordinates) of the Global Positioning System (GPS) enabled device 106. Based on the geotag, the server 102 may perform a search for relevant downloadable content that may be associated with a subject matter of interest within predetermined user preferences. The server 102 may also provide the search results to a Global Positioning System (GPS) enabled device 106 based on the approximate location of the Global Positioning System (GPS) enabled device 106.

In an exemplary embodiment, the server 102 may receive a request from a Global Positioning System (GPS) enabled device 106 and/or a user system not associated with the Global Positioning System (GPS) enabled device 106 for downloadable content that may be associated with one or more proximal landmarks at least based on the Global Positioning System (GPS) enabled device's 106 approximate location and/or future location. Based on this request, the server 102 may search for and provide relevant downloadable content to a Global Positioning System (GPS) enabled device 106.

In exemplary embodiments, the system 100 may include a server 102 communicatively coupled to a network 104, and one or more Global Positioning System (GPS) enabled devices 106 communicatively coupled to the network 104. The network 104 may communicate content signals from the server 102 to the Global Positioning System (GPS) enabled devices 106.

The content signals may be, for example, video signals and/or audio signals, data, requests, other digital information, and/or combinations thereof. The content signal may be used to display content using a display module associated with the Global Positioning System (GPS) enabled device 106. Content may be video, audio, text, and/or other types of visual or audible information.

The server 102 may periodically receive a polling message from the Global Positioning System (GPS) enabled device 106 and may aggregate the polling data (e.g., a geotag) included in the polling message to determine the location of the Global Positioning System (GPS) enabled device 106, to determine if the Global Positioning System (GPS) enabled device 106 is near a location that may be associated with a subject matter of interest as defined in a user profile, and to search for downloadable content that may be relevant to the subject matter of interest. The server 102 may also generate and communicate the content signal to the Global Positioning System (GPS) enabled device 106 via the network 104 based on one or more user rules.

In exemplary embodiments, the server 102 may also receive a request from the Global Positioning System (GPS) enabled device 106 for downloadable content that may be relevant to a subject matter of interest already defined in the user profile and/or new to the user profile. Based on the location data (e.g., geotag) associated with the request, the server 102 may search for downloadable content that is relevant to the Global Positioning System (GPS) enabled device 106 approximated location and/or future location and the subject matter of interest. The server 102 may also generate and communicate the content signal to the Global Positioning System (GPS) enabled device 106 via the network 104 based on at least one or more user rules.

The network 104 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In an exemplary embodiment, the network 104 may include one or more networks operating as a stand-alone network or in cooperation with each other. Use of the term network herein is not intended to limit the network to a single network.

In an exemplary embodiment, the Global Positioning System (GPS) enabled device 106 may be a hardware device that may receive a content signal from the network 104, may cause display and/or playing of the content signal using a display module and/or speaker module associated with the Global Positioning System (GPS) enabled device 106, and may communicate messages to the network 104. For example, the Global Positioning System (GPS) enabled device 106 may cause display of video stream data using a display module associated with the Global Positioning System (GPS) enabled device 106, which may be, for example, a cellular telephone 106A. In another example, the Global Positioning System (GPS) enabled device 106 may be a navigation system 106B. In yet another example, the Global Positioning System (GPS) enabled device 106 may be a personal digital assistant (PDA) 106N.

The Global Positioning System (GPS) enabled device 106 may include wireless telephones, cellular telephones, mobile telephones, or satellite telephones, Personal Digital Assistants (PDA), portable computers, handheld MP3 players, handheld video players, personal media players, watches, gaming devices, Global Positioning System (GPS) navigation devices, portable televisions, or any other Global Positioning System (GPS) enabled devices 106 capable of receiving content signals.

It is noted that system 100 illustrates a simplified view of various components included in a preference based location aware content distribution system, and that other hardware devices and software not depicted may be included in the system 100. It is also noted that the system 100 illustrates only a single server 102 and a single network 104. It will be appreciated that multiple instances of these devices may be used. The server 102 and the Global Positioning System (GPS) enabled device 106 are discussed in further detail below.

Figure 2:
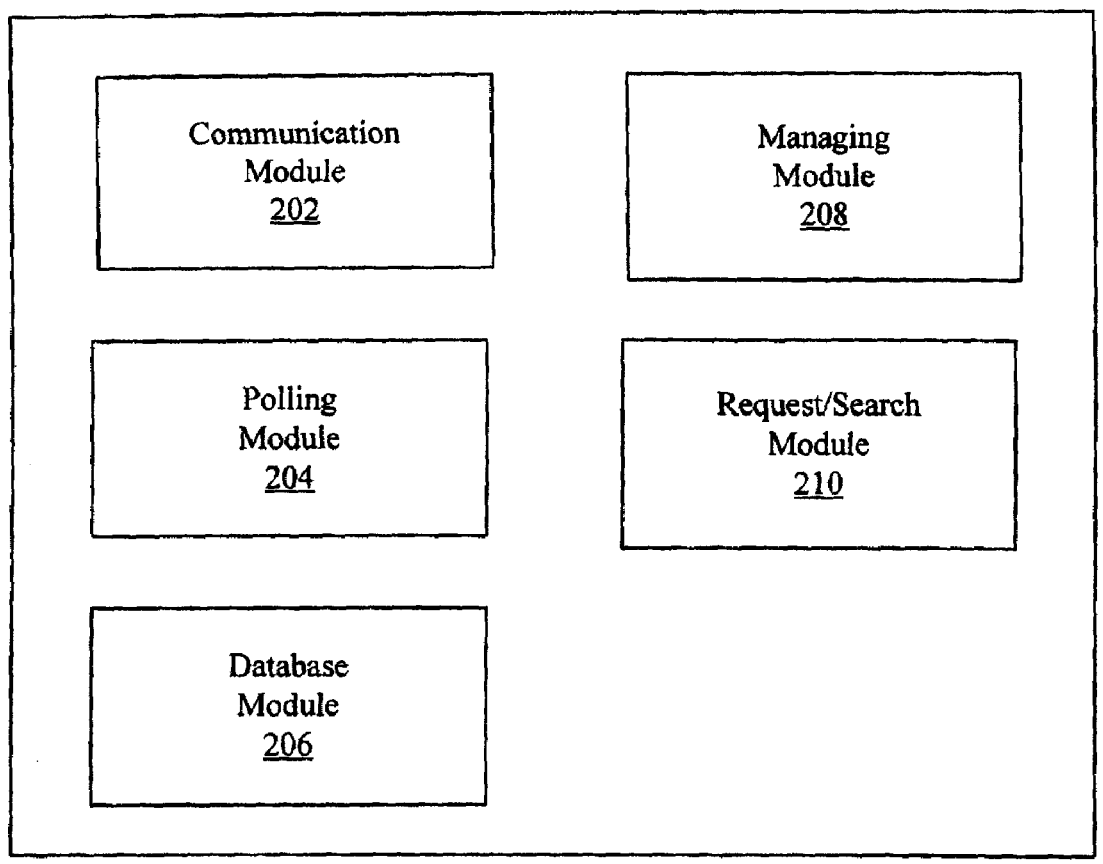
FIG. 2 illustrates exemplary modules of a server in accordance with exemplary embodiments.

FIG. 2 illustrates various modules of the server 102 in accordance with exemplary embodiments. In an exemplary embodiment, the server 102 may include a communication module 202, a polling module 204, a database module 206, a managing module 208, and a request/search module 210. It is noted that the modules 202, 204, 206, 208, and 210 are exemplary. The functions of the modules 202, 204, 206, 208, and 210 may be performed at other modules remote or local to the server 102, and the modules 202, 204, 206, 208, and 210 may be combined and/or separated.

The database module 206 may have access to one or more user profiles created by a user associated with a Global Positioning System (GPS) enabled device 106. The database module 206 may include software and/or hardware to store and analyze the user profile to determine if a profile is associated with a particular Global Positioning System (GPS) enabled device 106. The database module 206 may identify one or more user profiles associated with a Global Positioning System (GPS) enabled device 106 by assigning a unique identification number to each user profile associated with a particular user and/or Global Positioning System (GPS) enabled device 106.

The database module 206 may also include software and/or hardware to analyze the user profile information associated with the user profile. User profile information may include user preferences associated with one or more subject matters that may interest a user. For example, user profile information may include one or more search topics that may have been created using a predetermined taxonomy. In various embodiments, user profile information may include one or more search topics that may have been created using a user specific taxonomy. The database module 206 may include parsing software to decipher a search topic created using a user specific taxonomy.

User profile information may also include travel route information that may have been provided by a user prior to traveling and/or using a user system that may not be associated with the Global Positioning System (GPS) enabled device 106. Travel route information may include a starting destination and an ending destination. Travel route information may also include information associated with the Global Positioning System (GPS) enabled device's 106 approximate location and/or future location. The user system may include, but is not limited to: e.g., any computer device, or communications device including, e.g., a personal computer (PC), a workstation, a mobile device, a phone, a handheld PC, a personal digital assistant (PDA), a thin system, a fat system, network appliance, an Internet browser, a paging device, an alert device, a television, an interactive television, a receiver, a tuner, a high definition (HD) television, an HD receiver, a video-on-demand (VOD) system, a server, or other device. In exemplary embodiments, user system may include an interface to display information received from the server 102 over network 104.

User profile information may also include one or more user rules regarding what content should be transmitted to the Global Positioning System (GPS) enabled device 106 and/or how the content should be transmitted to the Global Positioning System (GPS) enabled device 106. The one or more user rules may be applied to the downloadable content by the server 102 prior to transmission. For example, a user rule may include the rule that there are no user rules. Accordingly, the server 102 may transmit any downloadable content retrieved based on a periodic polling of the Global Positioning System (GPS) enabled device's 106 location or a request for relevant downloadable content from the Global Positioning System (GPS) enabled device 106. In another example, a user rule may include the rule that the server 102 notify the user associated with the Global Positioning System (GPS) enabled device 106 to receive input from the user whether to transmit the content prior to transmitting any relevant downloadable content to the Global Positioning System (GPS) enabled device 106. In yet another example, a user rule may include the rule that the server 102 may transmit specific types of relevant downloadable content, such as, downloadable content that is not associated with a financial charge, without permission from the user associated with Global Positioning System (GPS) enabled device 106. Furthermore, the rule may dictate that server 102 notify the user prior to transmission.

User profile information may also include tokens that may be used to access closed source information. For example, a user may have a pre-existing subscription to an online resource, such as, National Geographic. User profile information may include tokens and/or information necessary to access the information provided by the user's pre-existing subscription.

The database module 206 may also update user profile information as it is modified by a user using the Global Positioning System (GPS) enabled device 106. For example, the Global Positioning System (GPS) enabled device 106 may transmit new and/or additional travel route information and/or search topic information from the Global Positioning System (GPS) enabled device 106 to the server 102 while traveling and/or prior to traveling. Server 102 may update the user profile information based on these changes. Based on the updated user profile information received, the server 102 may modify one or more search queries prior to searching for relevant downloadable content.

The polling module 204 may periodically receive polling messages from the Global Positioning System (GPS) enabled device 106. Polling messages may include polling data (e.g., geotag) associated with the Global Positioning System (GPS) enabled device's 106 approximate location. Based on one or more geotags received from the Global Positioning System (GPS) enabled device 106, the server 102 may perform a search for relevant downloadable content using user profile information associated with the Global Positioning System (GPS) enabled device 106. Accordingly, the server 102 may access the database module 206 to analyze the user profile information.

The request/search module 210 may receive requests for searches from the Global Positioning System (GPS) enabled device 106. Based on the request information, the server 102 may update the user profile information and may formulate a search query. For example, the request/search module 210 may receive a request for relevant downloadable content based on the Global Positioning System (GPS) enabled device's 106 approximate location. The request/search module 210 may use the geotag associated with the request information and the user profile information to formulate a search query that results in relevant downloadable content.

In exemplary embodiments, the request/search module 210 may formulate a search query based on the polling information provided by the polling module 204 and the user profile information provided by the database module 206. Accordingly, the request/search module 210 may merge the information from the polling module 204 and the database module 206, create a search query which results in the identification and/or retrieval of relevant downloadable content. The request/search module 210 may also store the search query results.

The managing module 208 may access the search query results in the request/search module 210 and one or more user rules associated with the user profile information in the database module 206 to apply the one or more user rules to the search query results prior to transmitting the search query results to the Global Positioning System (GPS) enabled device 106. Based on the one or more user rules, the managing module 208 may transmit notification to the Global Positioning System (GPS) enabled device 106 of the type of search query results. The managing module 208 may also receive a response to the notification that may instruct the managing module 208 which, if any, of the search query results should be transmitted to the Global Positioning System (GPS) enabled device 106.

The communication module 202 may communicate content signals from the server 102 to the network 104. The communication module 202 also may communicate messages received from the other modules 204, 206, 208, and 210 to the network 104, and may communicate messages to the other modules 204, 206, 208, and 210 received from the network 104. The communication module 202 may also generate the content signal (e.g., the search results for transmission) and may communicate the content signal to the Global Positioning System (GPS) enabled device 106.

Figure 3:
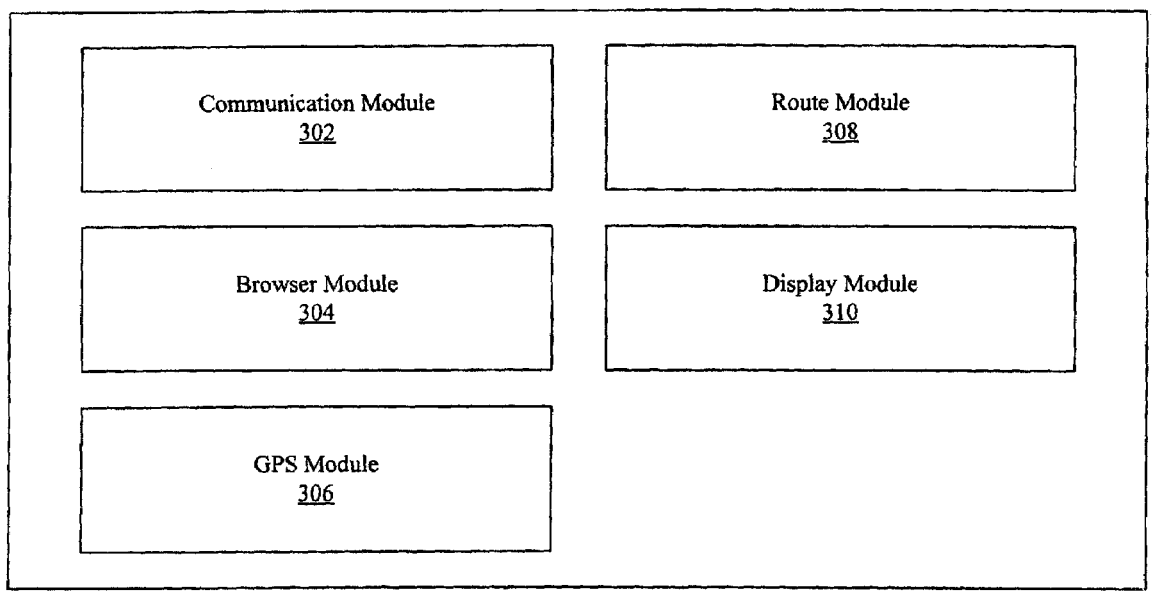
FIG. 3 illustrates exemplary modules of a Global Positioning System (GPS) enabled device in accordance with exemplary embodiments.

FIG. 3 illustrates exemplary modules of a Global Positioning System (GPS) enabled device 106 in accordance with exemplary embodiments. The Global Positioning System (GPS) enabled device 106 may receive the content signal from the server 102 via the network 104, may cause display/playing of the content signal, and may communicate various messages with the server 102 via the network 104.

In an exemplary embodiment, the Global Positioning System (GPS) enabled device 106 may include a communication module 302, a browser module 304, a Global Positioning System (GPS) module 306, a route module 308, and a display module 310. It is noted that the modules 302, 304, 306, 308, and 310 are exemplary. The functions of the modules 302, 304, 306, 308, and 310 may be performed by other modules remote or local to the Global Positioning System (GPS) enabled device 106, and the modules 302, 304, 306, 308, and 310 may be combined and/or separated.

The communication module 302 may provide communication between the Global Positioning System (GPS) enabled device 106 and the network 104. The communication module 302 may forward the content signal and/or messages received from the network 104 to the other modules 304, 306, 308, and 310, and may communicate messages received from the modules 304, 306, 308, and 310 to the network 104.

The browser module 304 may include a web browser client installed on the Global Positioning System (GPS) enabled device 106, such as, but not limited to, INTERNET EXPLORER™, NAVIGATOR™, or FIREFOX™ web browser programs, offered by Microsoft Corporation of Redmond, Wash., Time Warner of New York, N.Y., and the Mozilla Foundation of Mountain View, Calif., respectively.

The web browser may be used to input and/or receive information from the server 102. For example, the web browser may be used to access and/or modify a user profile using the Global Positioning System (GPS) enabled device 106, access one or more search query results, and/or create a request for relevant downloadable content.

The Global Positioning System (GPS) module 306 may provide preferences to be set with regard to Global Positioning System (GPS) capabilities. For example, a user may enable one or more Global Positioning System (GPS) capabilities using the Global Positioning System (GPS) module 306. In addition, a user may set how often the Global Positioning System (GPS) module 306 may transmit polling information containing a geotag with the Global Positioning System (GPS) enabled device's 106 approximate location to the server 102. For example, the Global Positioning System (GPS) module 306 may be configured to transmit polling information to the server 102 every 60 seconds.

The route module 308 may provide travel route building capabilities that may allow a user to input a current and/or future travel route using the Global Positioning System (GPS) enabled device 106. The route module 308 may receive a starting destination and/or an ending destination as input and may provide one or more travel routes as options. Accordingly, the route module 308 may access Global Positioning System (GPS) information from the server 102 and/or the Global Positioning System (GPS) module 306 to predict and/or create the one or more travel routes based on the Global Positioning System (GPS) enabled device's 106 approximate location and/or past location. The route module 308 may also receive a users choice of travel route as input.

The display module 310 may control display/play of the content signal and/or various graphical user interfaces associated with the Global Positioning System (GPS) enabled device 106. To cause display of the content signal, the display module 310 may receive instructions from a user input device associated with the Global Positioning System (GPS) enabled device 106 (e.g., key-board, stylus, scroll bar and the like) and may display/play a particular search query result based on the received instructions. The display module 310 also may cause display of a graphical user interface associated with the web browser.

Figure 4:
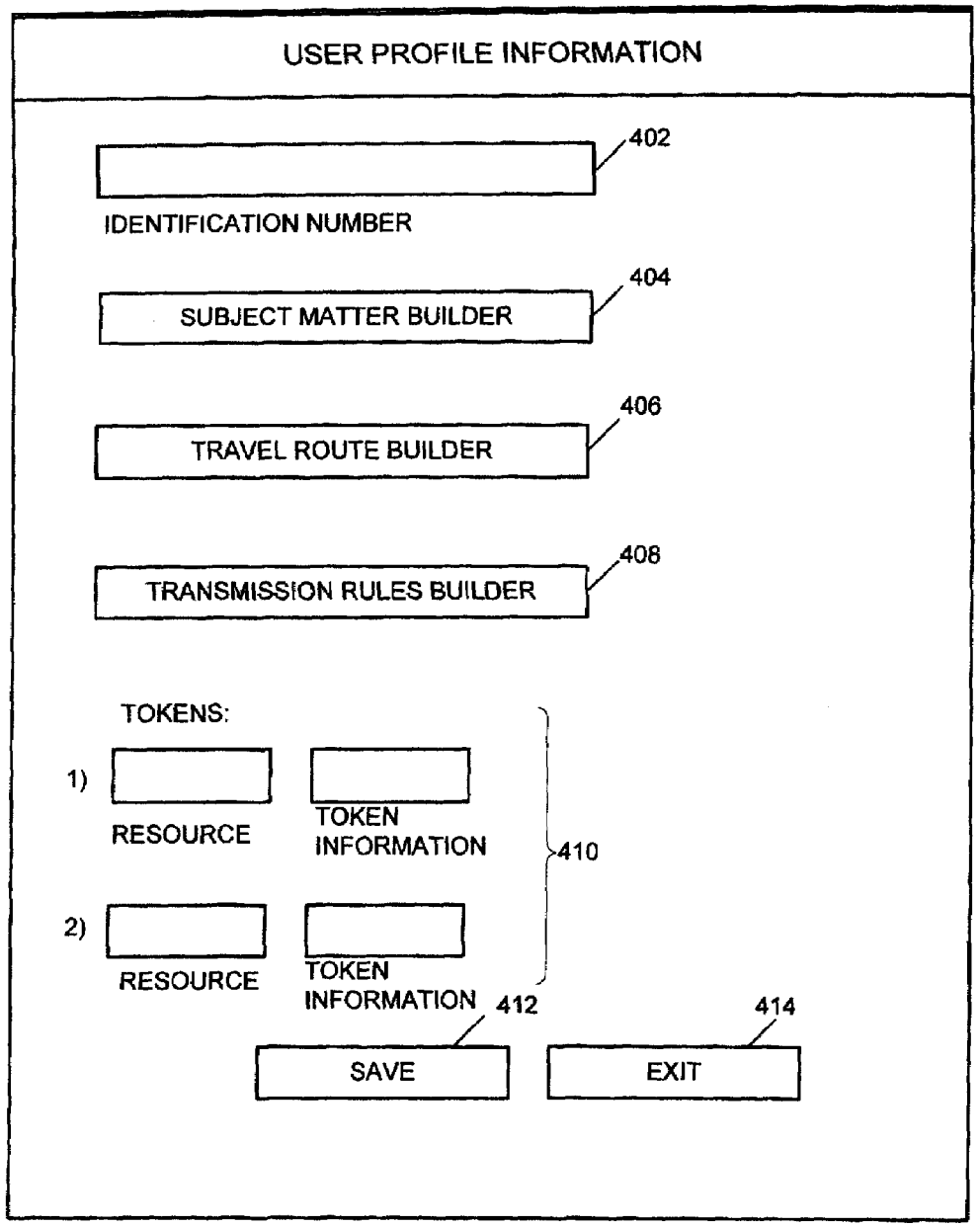
FIG. 4 illustrates a user profile graphical user interface in accordance with exemplary embodiments.

FIG. 4 illustrates a user profile graphical user interface in accordance with exemplary embodiments. The user profile graphical user interface 400 may permit the user to input user profile information via the Global Positioning System (GPS) enabled device 106.

In an exemplary embodiment, the user profile graphical user interface 400 may be displayed in response to a user request to view the user profile graphical user interface 400. For example, the user may use a user input device associated with a user system and/or the Global Positioning System (GPS) enabled device 106 to generate a user profile display request that requests the user system and/or the Global Positioning System (GPS) enabled device 106 to cause display of the user profile graphical user interface 400. When the user profile display request is received, a display module of a user system and/or the display module 310 of the Global Positioning System (GPS) enabled device 106 may generate the user profile graphical user interface 400.

By way of non-limiting example, the user profile graphical user interface 400 may be arranged as depicted in FIG. 4. Near the top of the of the user profile screen, the user may have the choice to access one or more screens associated with a subject matter builder using button 404, one or more screens associated with a travel route builder using button 406, and/or one or more screens associated with a transmission rules builder using button 408. The user may also input information into an identification number data field using data field 402 and/or a resource data field and token information data field using tokens data fields 410. In addition, the user may save a user profile to the server 102 by activating (e.g., clicking on) a save button 412. The user may also exit the user profile graphical user interface 400 by activating an exit button 414

If, for example, a user is a returning user, identification number data field 402 may be pre-filled. If, however, a user is new, identification number data field 402 may be filled in by the user using a newly assigned identification number that may have been transmitted to a user system, the Global Positioning System (GPS) enabled device 106, sent via snail mail, and/or any other methods of sending a identification number. Identification number may be used to associate one or more user profiles with one or more particular Global Positioning System (GPS) enabled devices 106.

In exemplary embodiments, one or more screens associated with a subject matter builder (not shown) may include predetermined taxonomy that may be used to build one or more subject matters of interest (e.g., search topics of interest). For example, a first screen may include very broad and general topics, such as, sports, museums, and/or concerts. For example, a second screen may include more specific subjects associated with a general topic listed on the first screen. For example, a third screen may include even more specific subjects associated with a more general topic listed on the second screen. For example, the user may activate one or more buttons associated with a topic on each screen to build one or more subject matters of interest. In addition, an other data field may be provided to allow for a user to use his/her own language to build a subject matter of interest. Parsing software may then be used to decipher the data inputted into the other data field.

In exemplary embodiments, one or more screens associated with a travel route builder (not shown) may include one or more data fields associated with a start location and/or one or more data fields associated with an end location. Based on this information, the user profile graphical user interface 400 may display one or more options of a travel route for the user.

In exemplary embodiments, one or more screens associated with a transmission rules builder (not shown) may include a list of one or more predetermined rules that a user may select from. In addition, a user may input data into an other data field that may be parsed using parsing software to decipher the data.

It is noted that the above description describes a user system and/or Global Positioning System (GPS) enabled device 106 causing display of the user profile graphical user interface 400 using a display module. The user profile graphical user interface 400 may be presented at a computer, mobile phone, or other device capable of presenting a graphical user interface local or remote to the user system and/or the Global Positioning System (GPS) enabled device 106. For example, a user may use their computer at work to access the user profile graphical user interface 400 to input user profile information to be used in combination with the server 102 and the Global Positioning System (GPS) enabled device 106.

Figure 5:
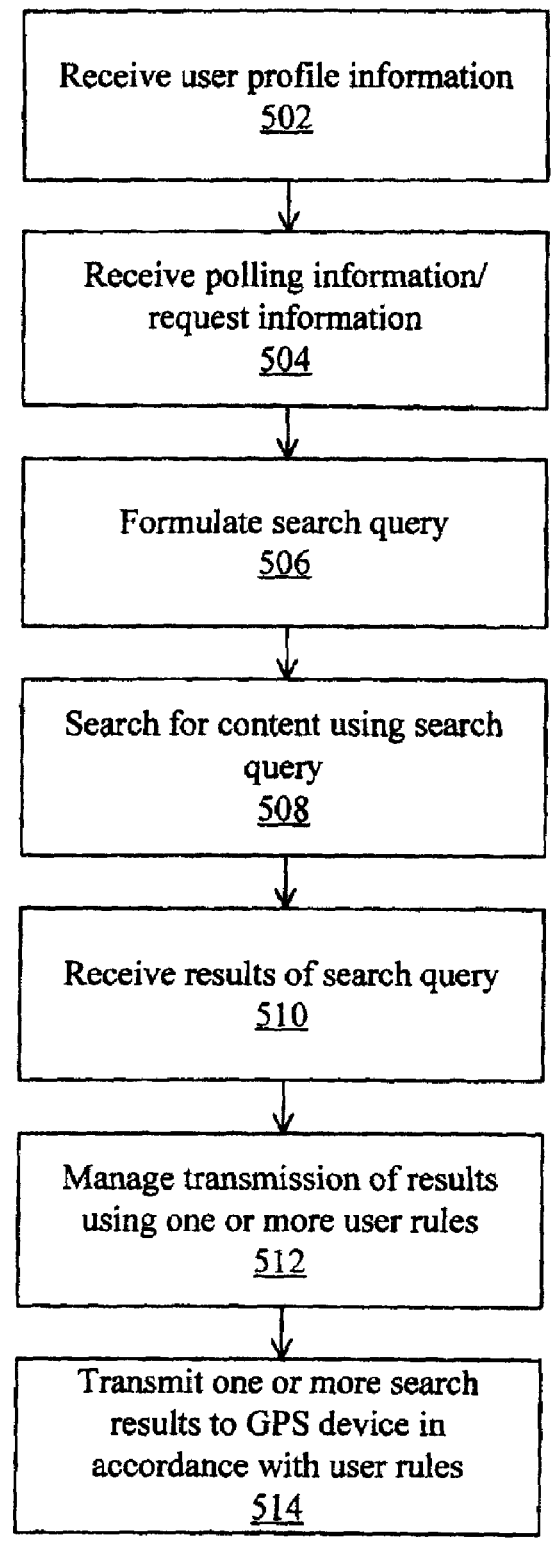
FIG. 5 illustrates a method for providing location specific downloadable content to a Global Positioning System (GPS) enabled device in accordance with exemplary embodiments.

FIG. 5 illustrates a method for providing relevant downloadable content to a Global Positioning System (GPS) enabled device 106 in accordance with exemplary embodiments. This exemplary method is provided by way of example, as there are a variety of ways to carry out methods disclosed herein. The method 500 shown in FIG. 5 can be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

In block 502, the method may include receiving user profile information from a user system and/or a Global Positioning System (GPS) enabled device 106. In an exemplary embodiment, the server 102 may receive user profile information from a user using the user profile graphical user interface 400 on a user system and/or a Global Positioning System (GPS) enabled device 106. The method 500 may continue to block 504.

In block 504, the method may include receiving polling information and/or a request for relevant downloadable content from the Global Positioning System (GPS) enabled device 106. The polling information may include the approximate location of the Global Positioning System (GPS) enabled device 106. The request information may include the approximate location and/or future location of the Global Positioning System (GPS) enabled device 106. In addition, the request may include an updated travel route that may be used to determine the current location and/or future location of the Global Positioning System (GPS) enabled device 106. The method 500 may continue to block 506.

In block 506, the server 102 may merge the polling information and/or request information received in block 504 with user profile information to formulate a search query for relevant downloadable content. For example, polling information received from a Global Positioning System (GPS) enabled device 106 may include a geotag that references coordinates that are near a landmark of interest as defined by the subject matter of interest in the user profile. The server 102 may then merge the polling information and subject matter of interest information located in the user profile to formulate a search query. In addition, the server may add token information to the search query to provide access to closed source resources that may contain relevant downloadable content. The method 500 may continue to block 508.

In block 508, the server 102 may search a wide variety of open source and closed source resources for relevant downloadable content. The server 102 may search resources based on a search query. For example, the server 102 may search resources based on a search query of "Wars" and "Williamsburg, Va." The method 500 may continue to block 510.

In block 510, the server 102 may receive one or more search query results. These results may include documents, links to documents, audio files, links to audio files, video files, links to video files, and/or any other information that may be relevant and transmittable to the Global Positioning System (GPS) enabled device 106. The method 500 may continue to block 512.

In block 512, the server 102 may manage the transmission of the one or more search query results to the Global Positioning System (GPS) enabled device 106 by accessing and applying one or more user rules defined in the user profile. For example, a user rule may include the rule that there are no user rules. Accordingly, the server 102 may transmit any of the one or more search query results retrieved based on a period polling of the Global Positioning System (GPS) enabled device's 106 location or a request for relevant downloadable content from the Global Positioning System (GPS) enabled device 106. In another example, a user rule may include the rule that the server 102 notify the user associated with the Global Positioning System (GPS) enabled device 106 prior to transmitting any of the one or more search query results to the Global Positioning System (GPS) enabled device 106. In yet another example, a user rule may include the rule that the server 102 may transmit specific types of the one or more search query results, such as, search query results that are not associated with a financial charge, without first obtaining permission from the user associated with Global Positioning System (GPS) enabled device 106. In other cases, the rule may dictate that server 102 notify the user prior to transmission. The method 500 may continue to block 514.

In block 514, the server 102 may transmit one or more search query results to the Global Positioning System (GPS) enabled device 106 in accordance with the one or more user rules. The one or more search query results may include documents, links to documents, audio files, links to audio files, video files, links to video files, and/or any other information that may be relevant and transmittable to the Global Positioning System (GPS) enabled device 106. In exemplary embodiments, the user associated with the Global Positioning System (GPS) enabled device 106 may request additional information if desired. The method 500 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising
receiving data associated with retrieving location specific downloadable content for a Global Positioning System (GPS) enabled device via a network, wherein receiving data comprises receiving a user subject matter preference;
storing in a database data associated with user profile information comprising at least one of:
a user subject matter preference and a user token;
retrieving the location specific downloadable content at least based on an approximate location of the Global Positioning System (GPS) enabled device and the user subject matter preference; and
sending the location specific downloadable content to the Global Positioning System (GPS) enabled device via the network.

2. The method of claim 1, wherein receiving data further comprises receiving user profile information associated with one or more user preferences.

3. The method of claim 2, wherein the one or more user preferences include at least one of:
a travel route built prior to traveling using a user system, a travel route built prior to traveling using the Global Positioning System (GPS) enabled device, and a travel route built while traveling using the Global Positioning System (GPS) enabled device.

4. The method of claim 1, wherein the user preferred search topic includes at least one of:
a search topic built from a predetermined taxonomy and a search topic built from user specific taxonomy.

5. The method of claim 1, wherein receiving data further comprises receiving a request for location specific downloadable content from the Global Positioning System (GPS) enabled device.

6. The method of claim 5, wherein retrieving location specific downloadable content further comprises formulating a search query at least based on the request for location specific downloadable content.

7. The method of claim 6, wherein retrieving location specific downloadable content further comprises receiving one or more search results from the search query.

8. The method of claim 1, wherein sending location specific downloadable content to the Global Positioning System (GPS) enabled device further comprises managing transmission of one or more search results to the Global Positioning System (GPS) enabled device based on one or more predetermined user rules.

9. The method of claim 8, further comprising sending location specific downloadable content to the Global Positioning System (GPS) enabled device in response to polling information based on the one or more predetermined user rules.

10. The method of claim 8, wherein the one or more predetermined user rules include at least one of:

no user rules, query a user associated with the Global Positioning System (GPS) enabled device for instructions prior to sending location specific downloadable content to the Global Positioning System (GPS) enabled device, and query the user associated with the Global Positioning System (GPS) enabled device in the event of one or more predetermined occurrences.

11. The method of claim 1, further comprising providing location specific downloadable content to the Global Positioning System (GPS) enabled device based on the approximate location of the Global Positioning System (GPS) enabled device.

12. The method of claim 1, further comprising providing location specific downloadable content to the Global Positioning System (GPS) enabled device based on the future location of the Global Positioning System (GPS) enabled device.

13. A computer readable media comprising code to perform the acts of the method of claim 1.

14. A system, comprising:
a database for storing data associated with retrieving location specific downloadable content, wherein the database stores data associated with user profile information comprising at least one of:
a user subject matter preference and a user token; and
a network element communicatively coupled to a network and is configured to:
receive data from a Global Positioning System (GPS) enabled device wherein the data comprises information relating at least in part to retrieving the location specific downloadable content,
search for location specific downloadable content based on the stored data in the database, based on at least one user subject matter preference, and based on the data, and
send the location specific downloadable content to the Global Positioning System (GPS) enabled device.

15. The system of claim 14, wherein the Global Positioning System (GPS) enabled device is one of: a cellular phone, a portable computer, a watch, a gaming device, a personal media player, a portable television, a GPS navigation device, and a personal digital assistant.

16. The system of claim 14, wherein the network element is further configured to send location specific downloadable content based on one or more predetermined user rules.

17. The system of claim 16, wherein the one or more predetermined user rules include at least one of:
no user rules, query a user associated with the Global Positioning System (GPS) enabled device for instructions prior to providing location specific downloadable content to the Global Positioning System (GPS) enabled device, and query the user associated with the Global Positioning System (GPS) enabled device in the event of one or more predetermined occurrences.

18. A method, comprising:
receiving data associated with retrieving location specific downloadable content for a Global Positioning System (GPS) enabled device via a network;
retrieving the location specific downloadable content at least based on an approximate location of the Global Positioning System (GPS) enabled device;
formulating a search query at least based on a request for location specific downloadable content and a user subject matter preference;
receiving one or more search results from the search query;
requesting confirmation from a user, based on a user rule, prior to sending the location specific downloadable content;
receiving confirmation from the user; and
sending the location specific downloadable content to the Global Positioning System (GPS) enabled device via the network.

* * * * *